(12) United States Patent
Hilberer

(10) Patent No.: US 6,817,247 B1
(45) Date of Patent: Nov. 16, 2004

(54) PRESSURE CONTROL DEVICE FOR VEHICLES

(75) Inventor: Eduard Hilberer, Hockenheim (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 09/786,274

(22) PCT Filed: Sep. 1, 1999

(86) PCT No.: PCT/EP99/06401

§ 371 (c)(1),
(2), (4) Date: Aug. 3, 2001

(87) PCT Pub. No.: WO00/13950

PCT Pub. Date: Mar. 16, 2000

(30) Foreign Application Priority Data

Sep. 2, 1998 (DE) .......................... 198 39 843

(51) Int. Cl.[7] .............................................. G01L 15/00
(52) U.S. Cl. ...................................................... 73/714
(58) Field of Search ........................... 137/884; 73/714, 73/756; 303/119.2, 119.3, DIG. 3, DIG. 4

(56) References Cited

U.S. PATENT DOCUMENTS 5,820,228 A * 10/1998 Schneider et al. ....... 303/119.3
5,866,822 A * 2/1999 Willig ........................... 73/719
6,007,162 A * 12/1999 Hinz et al. ............... 303/119.3
6,220,101 B1 * 4/2001 Schloss et al. ................ 73/756

FOREIGN PATENT DOCUMENTS

| DE | 42 32 586 | 3/1994 |
|---|---|---|
| DE | G 94 15 078.8 | 3/1995 |
| DE | 195 28 812 | 2/1997 |
| DE | 297 23 096 | 5/1998 |
| EP | 0 580 382 | 1/1994 |
| EP | 0 644 092 | 3/1995 |
| EP | 0 803 652 | 10/1997 |
| WO | 96/33081 | * 10/1996 |
| WO | WO 98/07603 | 2/1998 |

* cited by examiner

Primary Examiner—John Fox
(74) Attorney, Agent, or Firm—Crowell & Moring LLP

(57) ABSTRACT

The invention relates to a pressure control device for vehicles comprising a control device, a mechanical, pneumatic and/or hydraulic element and at least one sensor and/or at least one actuator. The invention is characterized in that, in the area of the sensors and/or actuators, recesses or cavities are provided in the control device and/or in the element. The sensors and/or actuators can at least be partially accommodated in said recesses or cavities.

29 Claims, 3 Drawing Sheets

PRESSURE CONTROL DEVICE FOR VEHICLES

BACKGROUND AND SUMMARY OF THE INVENTION

The invention relates to a pressure control device for vehicles comprising a control device, a mechanical, pneumatic and/or hydraulic element and at least one sensor and/or an actuator.

Such pressure control devices are provided for use in pressure medium systems of, among others, vehicles. These may be constructed as pneumatic or hydraulic systems, in which case brake systems, level control systems, etc. are supplied by means of these systems.

German patent document DE-A-44 45 125 discloses a housing for an electric component, which housing consists of a housing bottom part and a housing top part. These parts can be connected with one another. In addition, a support is known from this document which supports the electric component situated in the housing and has corresponding electric connecting devices for the sealed connection of the electric component situated in the housing with an electric component situated outside the housing. Although such an arrangement has advantages in a modular construction, it is very time-consuming to assemble it with additional components, such as sensors and actuators. Also, additional, relatively long cables for connecting the sensors and actuators with the control device as well as additional housings for the sensors and actuators are required for protection against environmental influences. In addition, high-expenditure wirings and measures have to be carried out in order to protect the known control device against line-borne interferences of the additional cables.

It is therefore an object of the present invention to provide a pressure control unit with a control device, a mechanical, pneumatic and/or hydraulic element and at least one sensor and/or an actuator. The connection of the control device with the sensors, actuators and additional elements requires only a small amount of material, permits fast assembly and therefore saves time and cost.

This object is achieved in that a known pressure control device is further developed so that, in the area of the sensors and/or actuators, recesses or holes are provided in the control device and/or the mechanical, pneumatic and/or hydraulic element, in which the sensors and/or actuators can be at least partially accommodated.

The reason is that, as a result of this measure according to the invention, the mechanical, pneumatic and/or hydraulic element is moved into the direct proximity of the control device, so that the cable lengths can be kept short. Because of the measure that the mechanical, pneumatic and/or hydraulic element comprises a pressure control device, the assembly time is also reduced because now only one component or the pressure control device has to be mounted on the vehicle essentially by itself and not, as previously, at least two components with an additional mounting of other cables. As a result, material costs are also saved because only few casing parts are required for protecting the respective components from environmental influences.

When, preferably, at least one sensor and/or an actuator is arranged in the casing, it is possible to calibrate and test the control device with the sensors and/or actuators as a simple structural component. When, preferably in the area of the sensors and/or actuators, recesses or holes are provided in the mechanical and/or pneumatic and/or hydraulic element and/or in the control device, the sensors and/or actuators can be moved into the direct proximity of the components of the control device, so that long cable lengths can be avoided. The holes or recesses are preferably constructed on mutually facing sides of the element and of the control device.

The control device used according to the invention is an electric and/or mechanical control device. The control device preferably comprises a printed circuit board which is provided with recesses or holes for the sensors and/or actuators. In this manner, an even more compact construction can be obtained which can be mounted more rapidly.

Also preferably, the pressure control device comprises a casing having a first and a second casing part, the casing parts being mutually connectible. The first casing part together with the second casing part for at least the control device forms an essentially closed chamber. This measure permits a simple mounting and, in addition, a simple protection against environmental influences for the control device and additional components, such as in particular electric components.

The connectibility of the first and second casing part is preferably detachable in a firm manner. According to the field of application, seals are provided which protect the casing interior against water, dirt or the like. Furthermore, connections of a mechanical or electrical nature are preferably provided which have the effect that the interior area of the casing can be connected with the exterior area.

The mechanical, pneumatic and/or hydraulic element is preferably the second casing part. Further material can be saved as a result of this measure.

The hydraulic element is preferably a valve block. In this manner, it is possible to use a valve block with the pertaining control device as a single structural component.

The second casing part is preferably a control valve block for the compressed-air system of a vehicle.

When a bending-resistant element is preferably provided, forces, which otherwise act upon the casing, can be compensated without damage to the casing or the control device.

The bending-resistant element is preferably a casing part. In addition, the bending-resistant element can preferably be connected with a casing part.

If the bending-resistant element is provided for absorbing the pressure forces of the sensors and/or actuators, the control device will be mechanically protected. If, for example, preferably the control device comprises a printed circuit board, as a result of the absorption of forces by the bending-resistant element, there will be no hairline cracks on the printed circuit board because the latter will not be bent as a result of the application of force to the bending-resistant element.

Preferably, the controlling and the signal processing of the sensors and/or actuators takes place in the control device.

At least one amplifier is preferably provided in the control device, which amplifier amplifies the signals of the sensors. An active and/or passive cooling of the amplifiers (or of corresponding power semiconductors) is preferably provided. This cooling preferably takes place by way of cooling sheets and a portion of the exterior part of the casing.

If the amplifiers are arranged preferably in the direct or indirect vicinity of the sensors, which can be assigned, the connections to the amplifiers can be kept short so that few outside interferences can enter these cables. If the electric connection between the sensor and the control device takes place at least partially by way of flexible lines or one flexible line, the sensors and actuators can be moved with respect to the control device while the connection to the control device would suffer no fatigue and would not be destroyed.

A storage element is preferably constructed in the pressure control device. Also preferably, the calibrating values of the sensors and/or actuators and/or regulating parameters or control parameters of the control device can be stored in the storage element. This measure has the advantage that no external storage elements are required so that additional longer cables are also avoided.

The sensors and/or actuators are preferably arranged in an area between the two casing parts. Also preferably, the sensors and/or actuators are held by the two casing parts. As a result of these measures, additional holding elements can preferably be saved and a mounting is correspondingly simplified.

If, preferably, at least one seal is provided which seals off the sensors and/or actuators, a discharge of pressure medium from the pressure medium outlet bore, for example, of a valve block, will be avoided. Depending on the embodiment of the present invention, different seals can be used which achieve the sealing in different fashions. The seal is preferably provided between the pressure connection of the second casing part and the sensor. As a result of this measure, only a single seal will be required. In addition, as a result of this measure, by means of the correspondingly firm or loose mounting of a component pressing onto the sensor, such as the first casing part or the bending-resistant element, the contact pressure onto the seal can be adapted according to the requirements or pressure conditions, the used material, the environmental influences and the like.

The sensor is preferably cup-shaped. Also preferably, the sensor is held or guided by way of the edge of the cup-bottom by a casing part. As a result of this measure, the cup-shaped sensors can be fitted well. In the event of corresponding pressure variations, these will not cause corresponding pressure medium leakages at this connection from the pressure medium to the control device.

When the sensor membrane is preferably constructed on the cup bottom, this membrane is protected from corresponding damage by a not quite appropriate mounting.

The invention will be described in the following as an example without any limitation of the general idea of the invention by means of embodiments with reference to the drawings, to which reference is also made with respect to the disclosure of all details according to the invention which are not explained in detail in the text.

DETAILED DESCRIPTION OF THE DRAWINGS

In the following figures, respective identical or corresponding parts have the same reference number so that they will not be introduced again and only deviations of the embodiments illustrated in these figures from the first embodiment will be discussed.

Figure 1:
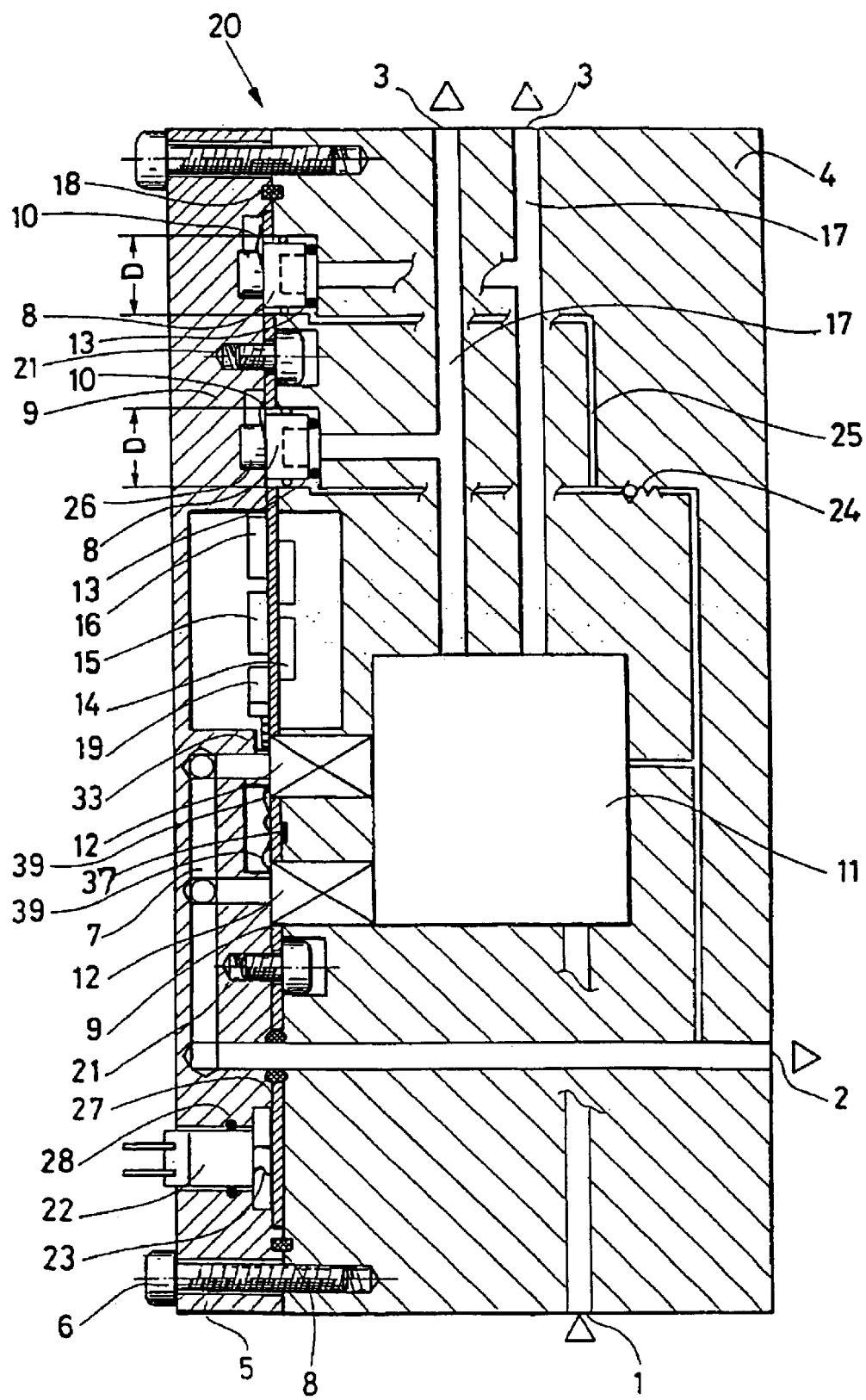
FIG. 1 is a schematic representation of an embodiment of a casing according to the invention.

FIG. 1 is a schematic representation of a first embodiment of the pressure control device according to the invention.

Within the scope of this invention, the term pressure control device also comprises a pressure regulating device. FIG. 1 specifically shows a control device cover 5 which is connected with a housing bottom part 4 by way of screws 6. The pressure control device comprises the housing formed by the housing bottom part 4 and the control device cover 5. The control device 20 is arranged in this housing. The housing bottom part 4 is a valve block. The valve block has a pressure medium feeding connection 1, a pressure medium return flow connection 2 and outlet connections 3. The outlet connections 3 are respectively connected with pressure medium outlet bores 17. Furthermore, a mechanical control and regulating unit 11 is provided in the valve block and is connected with solenoid valves 12. In addition, recesses are provided in the valve block into which the control device screw heads 21 and pressure sensors 8 can be fitted. The mechanical control and regulating unit is also connected with a bore which leads to a return valve 24 which is connected with a relief bore 25 of the pressure sensors 8.

The control device 20 is fastened by means of control device screws 21 on the control device cover 5.

The components of the control device 20 are arranged on a printed circuit board 21. Holes are provided in the printed circuit board 27 for accommodating the control device screws 27, the sensors 8 and the solenoids 12 in each case at least partially. Above the bores for the sensors, recesses are provided in the control device cover 5, which recesses represent a relief space 26. The holes in the printed circuit board can also be called printed circuit board openings 9 which have a diameter D for the sensors. The signals from and to the sensors 8 are transmitted by way of flexible lines 10 to the printed circuit board or to components of the control device, which, in particular, are arranged on the printed circuit board. The components are, for example, microcontrollers 14, instrument amplifiers 15, electrically writable and readable or overwritable memories (such as EE or Flash ROM) 16 or power semiconductors 19.

In addition, solenoid valve vents 7 are provided in the control device cover 5. Sealing elements 13 are provided for sealing off, for example, the compressed air. For communicating with the exterior area, particularly for transmitting electric or electronic signals from and to the control device, connectors 22 are provided which have a connector line 23.

In order to protect the control device from environmental influences, such as dirt, water and the like, sealing elements are provided, such as a control device cover seal and a connector seal 28.

FIG. 1 shows an embodiment as a multichannel pressure control valve. The implemented example of the invention consists of a valve block 4, which has a pressure medium feeding connection 1, a pressure medium outlet connection 3 and a central pressure medium return flow connection 2 which, in the case of a pneumatic valve, is equal to a vent. The mechanical control and regulating unit 11 takes over the signal amplification functions and determines the backup regulating behavior of the valve in the event of a power failure.

The relief bore 25 of the relative pressure sensors 8 used in this example is connected with the return valve 24. As a result, it is possible to reduce pressure rises caused by temperature fluctuations in the relief space 26 to the central pressure medium return flow. In this manner, the pressure buildup in the relief space 26 due to sealing leakages can also be reduced. The return valve 24 prevents the penetration of pressure surges from the pressure medium return flow 2 into the relief space 26.

The electric connections, thus particularly the voltage supply and the output signal of the pressure sensors 8, are fed by means of a flexible line 10 to the electric or electronic control device 20. The output signal of the pressure sensors is amplified by the instrument amplifier 15, before it is processed by the processor.

When the operation of the control device is first started, two defined pressures are applied to the pressure sensors, and the measured pertaining output signal values, which were processed by the control device, are stored in an electrically writable and erasable or electrically overwritable memory. It is therefore possible to use low-cost, not adjusted relative pressure sensors and to calibrate these.

The heat of the power semiconductors is transmitted by way of an applied heat-conducting material 33 into the control device cover in order to prevent overheating.

The solenoid valves 12 are also mounted on the control device, and their electric connections are also guided to the control device by means of a flexible line.

By means of the electric line 23, the connector 22 is connected with the control device 20. By means of the sealing element 28, the connector 22 is sealed off with respect to the housing cover 5. The housing cover 5 is sealed off by means of the seal 18 with respect to the valve block 4. The housing cover 5 is screwed by means of the cover screws 6 onto the valve block. The valve block 4 represents the casing bottom part. As a result of this method of construction, a very compact design of a casing can be obtained which is easy to mount and in which a control device as well as a mechanical, pneumatic and/or hydraulic element, such as a valve block or a cylinder block, are integrated. In addition, flexible lines 39 are provided.

In FIG. 1, the housing cover 5 is constructed to be so bending-resistant that it absorbs and transmits forces affecting it while it is not significantly deformed or even damaged. The pressure forces acting upon the pressure sensors are therefore returned into the valve block. The reason is that the pressure sensors are held down by the housing cover 5.

Figure 2:
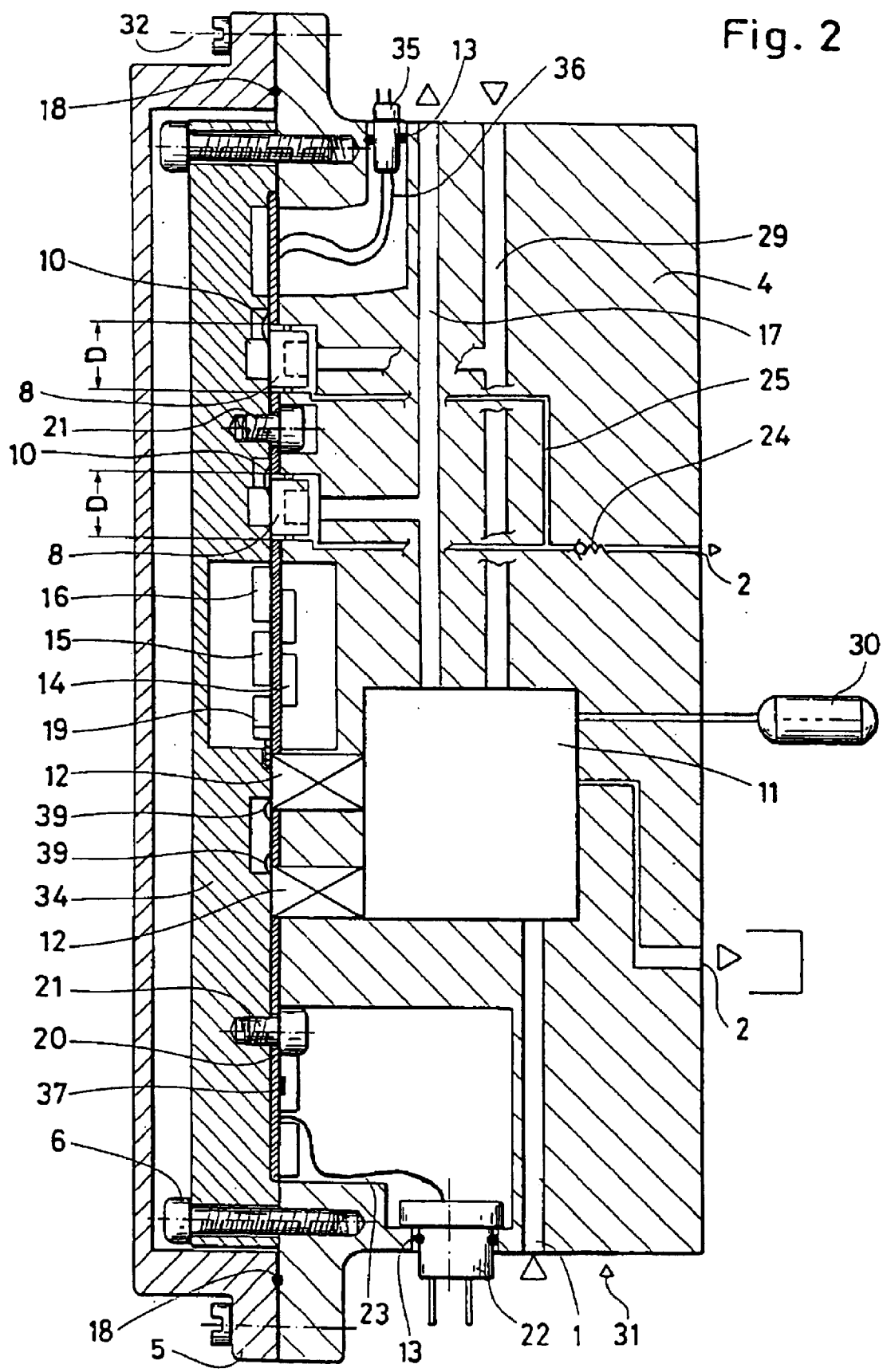
FIG. 2 is a schematic representation of another embodiment of a casing according to the invention.

The embodiment according to the invention illustrated in FIG. 2 shows an additional compressed-air storage device and a measuring connection for external pressures. External pressures can be measured by way of the measuring connection 29. This is required in the case of load sensing valve functioning methods. In addition, as illustrated above, an additional pressure medium storage device 30 exists so that the valve can rapidly react to high pressure demands in that pressure media are taken from this storage device. Another advantage of this construction is the possibility of absorbing external control pressures by the control connection 31.

Particularly in the case of narrow space conditions or narrow installation conditions, it is advantageous for the connector 22 to be arranged in the housing bottom part.

In addition, a bending-resistant component 34 is provided, which is not identical with the housing cover 5. As a result of this measure, particularly in the case of a large cover, the cover can be constructed at reasonable cost of a plastic material while the respective effective forces could not damage the cover. The bending-resistant component 34 can be constructed to be locally limited and small and can be connected particularly with the housing bottom part, thus, in this example, with the valve block. In this embodiment, the housing cover is screwed onto the housing bottom part by means of additional cover screws 32.

In addition, another connector 35 is shown which permits the receiving and processing or transmitting of external signals. The electric signals are fed to the control device by way of the signal line 36.

Thus, particularly also a control casing construction was introduced in which the following characteristics were in each case met individually, or partially or completely combined with one another. The casing bottom part is a valve block. The valve block has a pressure medium feeding connection and at least one pressure medium outlet connection. The pressure in the pressure medium outlet bore is measured by a pressure sensor. A microcontroller compares the pressure in the pressure medium outlet bore with stored pressure values and correspondingly readjusts by means of an electrically controlled actuator. A mechanical control and regulating unit exists which determines the pressure, control and emergency operating characteristics in the event of a power failure. A pressure medium return flow connection is provided which, in the case of a pneumatic application corresponds to a venting. In addition, an electric control device is provided which has at least a power semiconductor 19, a microcontroller 14 and a writable data memory 16. In the area of the sensors, the printed circuit board of the electric control device is provided with an opening through which the sensors are guided and/or kept down. The pressure forces acting upon the sensors are compensated by a bending-resistant component which is connected with the valve block. The sensor signal is amplified by amplifiers situated on the printed circuit board. The electric supply of the sensor and the electric output signal of the sensor are transmitted to the printed circuit board by means of a flexible line. The calibrating values of the sensors and. the regulating parameters of the control device are filed in the memory.

Figure 3:
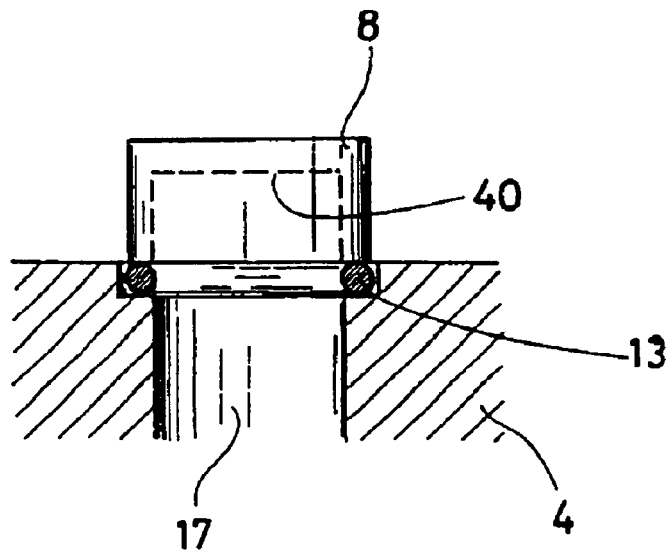
FIG. 3 is a schematic and enlarged representation illustrating the fitting of a sensor onto a valve block.

FIG. 3 shows a fitting of a sensor 8 into the valve block 4 or between the valve block 4 and the control device cover which, however, is not shown in FIG. 3. By the exercising of a pressure by means of the control device cover 5 onto the sensor 8, the sensor 8 is pressed downward so that the seal 13 is reduced in its vertical dimension. By means of this pressure sensor, the pressure medium pressure in the pressure medium outlet bore 17 is measured by way of the sensor membrane. The measured values are then processed in the control device 20 which is arranged in the proximity and is not shown.

Figure 4:
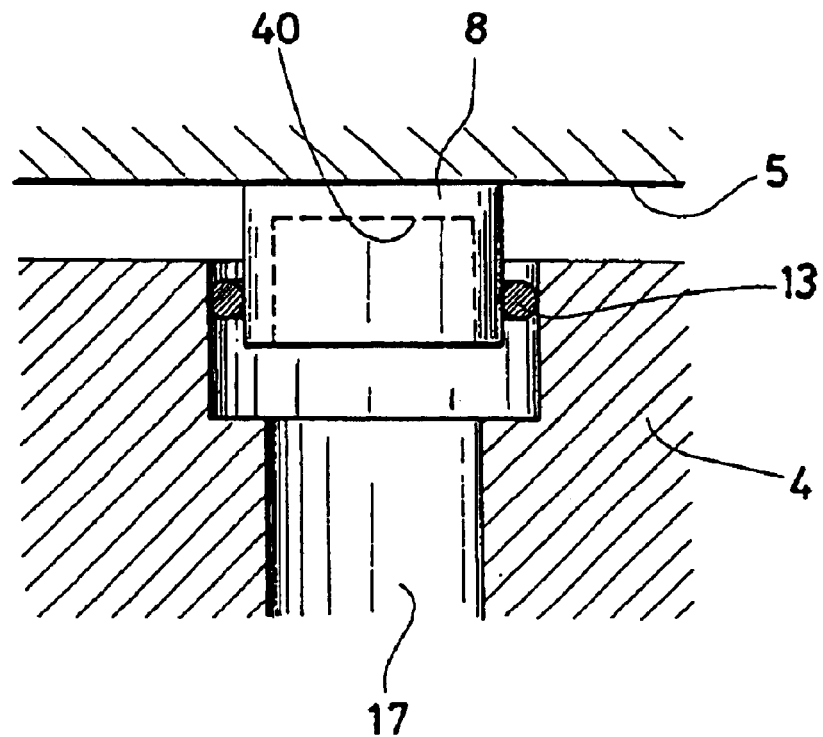
FIG. 4 is a schematic representation of another fitting of a sensor onto a valve block.

FIG. 4 illustrates another possibility for fitting the pressure sensor 8 onto the pressure medium outlet bore 17. Here, the seals are arranged laterally of the pressure sensor, which preferably has a pot-shaped construction. This is therefore preferably a radial seal. The dimension and the movement of the sensor in the upward direction is limited by the control device cover 5.

TABLE OF REFERENCE NUMBERS

1 Pressure medium feeding connection
2 pressure medium return flow connection
3 outlet connection
4 housing bottom part (valve block)
5 control device cover
6 screw
7 solenoid vent
8 pressure sensor
9 printed circuit board opening
10 flexible line
11 mechanical control and regulating unit
12 solenoid valve
13 sealing element
14 microcontroller
15 instrument amplifier
16 electrically writable and readable or overwritable memory (such as EE or Flash ROM)
17 pressure medium outlet bore 18 control device cover seal
19 power semiconductor
20 control device
21 control device screw
22 connector
23 connector line
24 return valve
25 relief bore
26 relief space
27 printed circuit board
28 connector seal
29 measuring connection
30 pressure medium memory
31 control connection
32 cover screw
33 heat-conducting material
34 bending-resistant component
35 connector
36 signal line
39 flexible line
40 sensor membrane

What is claimed is:

1. A pressure control device for a vehicle, comprising:
   a control device;
   at least one of a mechanical, pneumatic and hydraulic element coupled with the control device, wherein at least one of a recess and a hole is provided in at least one of the control device and the element;
   at least one sensor which is accommodatable at least partially in the at least one of the recess and the hole, wherein the at least one sensor is not rigidly attached to the control device, and a flexible electrical connection is provided between the at least one sensor and the control device, and wherein the at least one sensor in the at least one of the recess and the hole is displaceable; and
   a bending resistant element operatively coupled to the at least one sensor to absorb pressure forces acting on the at least one sensor.

2. The pressure control device according to claim 1, wherein the control device comprises a printed circuit board provided with the at least one of the recess and the hole for the at least one sensor.

3. The pressure control device according to claim 2, further comprising first and second casing parts, said first and second casing parts being mutually connectible such that the first and second casing parts form a substantially closed chamber.

4. The pressure control device according to claim 3, wherein said at least one of the mechanical, pneumatic and hydraulic element forms the second casing part.

5. The pressure control device according to claim 4, wherein said at least one of the mechanical, pneumatic and hydraulic element forms the second casing part.

6. The pressure control device according to claim 4, wherein the second casing part is a control valve block for a vehicle compressed-air system.

7. The pressure control device according to claim 4, wherein the bending-resistant element is one of the first and second casing parts.

8. The pressure control device according to claim 4, wherein the bending-resistant element is connectible with a casing part of the control device.

9. The pressure control device according to claim 8, wherein said first and second casing parts hold the at least one sensor arranged in an area therebetween.

10. The pressure control device according to claim 9, wherein the seal is provided between a pressure connection of the second casing part and the at least one sensor.

11. The pressure control device according to claim 4, wherein the at least one sensor is arranged in an area between the first and second casing parts.

12. The pressure control device according to claim 4, further comprising at least one seal provided to seal-off the at least one sensor arranged in the recess or hole.

13. The pressure control device according to claim 1, further comprising first and second casing parts, said first and second casing parts being mutually connectible such that the first and second casing parts form a substantially closed chamber.

14. The pressure control device according to claim 13, wherein said element is a hydraulic valve block.

15. The pressure control device according to claim 13, wherein the bending-resistant element is one of the first and second casing parts.

16. The pressure control device according to claim 13, wherein the bending-resistant element is connectible with a casing part of the control device.

17. The pressure control device according to claim 1, wherein said element is a hydraulic valve block.

18. The pressure control device according to claim 1, wherein the bending-resistant element is a casing part of the control device.

19. The pressure control device according to claim 1, wherein the bending-resistant element is connectible with a casing part of the control device.

20. The pressure control device according to claim 1, wherein the at least one sensor is controlled and has its signals processed in the control device.

21. The pressure control device according to claim 20, wherein a plurality of amplifiers are provided in the control device, said amplifiers being respectively arranged in direct or indirect vicinity of a plurality of sensors respectively assigned thereto.

22. The pressure control device according to claim 21, wherein calibration values of the at least one sensor and/or regulating or control parameters of the control device are storable in the storage element.

23. The pressure control device according to claim 1, further comprising an amplifier provided in the control device, said amplifier amplifying signals of the at least one sensor.

24. The pressure control device according to claim 1, further comprising a storage element arranged in the pressure control device.

25. The pressure control device according to claim 1, further comprising at least one seal provided to seal-off the at least one sensor arranged in the recess or hole.

26. The pressure control device according to claim 25, wherein the at least one sensor is held by a casing part via an edge of the pot-shaped construction.

27. The pressure control device according to claim 25, wherein a sensor membrane is arranged on a pot bottom of the pot-shaped construction.

28. The pressure control device according to claim 1, wherein the at least one sensor has a pot-shaped construction.

29. The pressure control device according to claim 28, wherein a sensor membrane is arranged on a pot bottom of the pot-shaped construction.

* * * * *